United States Patent [19]
Park et al.

[11] Patent Number: 5,943,682
[45] Date of Patent: Aug. 24, 1999

[54] PROGRAMMABLE CONTROL SEQUENCER OF DISK CONTROLLER AND METHOD FOR MAP ALLOCATION THEREFOR

[75] Inventors: Chan-Geu Park, Seoul; Jung-Il Park; Yong-Woo Park, both of Suwon; Jun-Jin Kong, Seongnam, all of Rep. of Korea

[73] Assignee: SamSung Electronics Co., Ltd., Suwon, Rep. of Korea

[21] Appl. No.: 08/777,142

[22] Filed: Dec. 30, 1996

[30] Foreign Application Priority Data

Dec. 30, 1995 [KR] Rep. of Korea ...................... 95-72286

[51] Int. Cl.[6] ............................. G11B 20/12; G06F 3/06
[52] U.S. Cl. ............................................................ 711/111
[58] Field of Search ................... 711/111, 112; 360/77.08

[56] References Cited

U.S. PATENT DOCUMENTS

| | | | |
|---|---|---|---|
| 4,050,094 | 9/1977 | Bourke | 711/206 |
| 4,080,651 | 3/1978 | Cronshaw et al. | 711/160 |
| 4,583,162 | 4/1986 | Prill | 711/213 |
| 4,866,601 | 9/1989 | DuLac et al. | 711/111 |
| 4,884,197 | 11/1989 | Sachs et al. | 711/123 |
| 4,918,587 | 4/1990 | Pechter et al. | 71/218 |
| 5,261,058 | 11/1993 | Squires et al. | 395/821 |
| 5,274,773 | 12/1993 | Squires et al. | 395/858 |
| 5,412,666 | 5/1995 | Squires et al. | 371/37.4 |
| 5,422,763 | 6/1995 | Harris | 360/51 |
| 5,530,825 | 6/1996 | Black et al. | 711/213 |
| 5,548,751 | 8/1996 | Ryu et al. | 707/102 |
| 5,559,982 | 9/1996 | Wideman | 711/111 |
| 5,564,118 | 10/1996 | Steely, Jr. et al. | 395/587 |
| 5,589,998 | 12/1996 | Yu | 360/78.14 |
| 5,592,348 | 1/1997 | Strang, Jr. | 360/77.08 |
| 5,596,736 | 1/1997 | Kerns | 711/4 |
| 5,596,737 | 1/1997 | Strang, Jr. | 711/213 |
| 5,610,808 | 3/1997 | Squires et al. | 364/131 |
| 5,627,946 | 5/1997 | Strang, Jr. | 711/112 |
| 5,640,600 | 6/1997 | Satoh et al. | 395/853 |

FOREIGN PATENT DOCUMENTS

| | | |
|---|---|---|
| 0517473A2 | 9/1992 | European Pat. Off. . |
| 0689207 A1 | 12/1995 | European Pat. Off. . |
| 4006986 A1 | 9/1990 | Germany . |

OTHER PUBLICATIONS

Dunnion, D., Stropoli, M. :Design a Hard–disk Controller with DSP Techniques, In: Electronic Design, Sep.22, 1988, pp. 117–119 and 121.

*Primary Examiner*—Eddie P. Chan
*Assistant Examiner*—Yamir Encarnación
*Attorney, Agent, or Firm*—Robert E. Bushnell, Esq.

[57] ABSTRACT

An improved programmable control sequencer and a method for its map allocation capable of reducing the size of program RAM used in a disk controller of a magnetic disk drive storage system, thereby efficiently reducing a work load of a microcontroller unit in the disk controller. The map allocation method is performed in a program random access memory having a 32×2 byte size of data storage area in the disk controller, the program random access memory being provided with the sequencer map allocation including a branch field, a next address/count field, an output field, a gate field, a field region and a data selection field. The branch field is provided with branch condition or count field enable information. The next address/count field selectively has a next address or a count value according to the branch condition. The output field is usable for testing synchronization outside the programmable control sequencer and the gate field for performing Read/Write gate control and making increase of target sector number and decrease of disk sector transmit count. The field region represents ECC/CRC block and CDR return and the data selection field is usable for comparing data from any data register with data read of the disk, thereby processing the data according to the compared result.

14 Claims, 12 Drawing Sheets

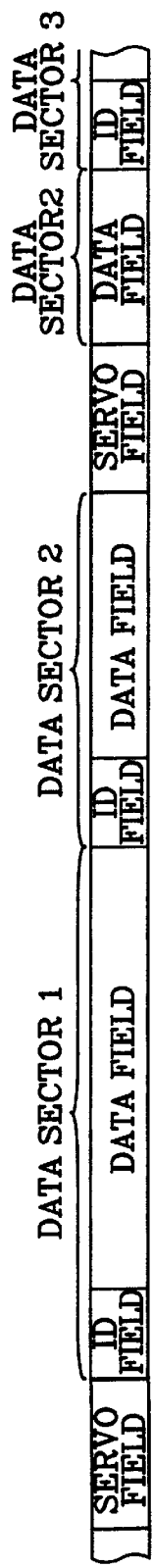
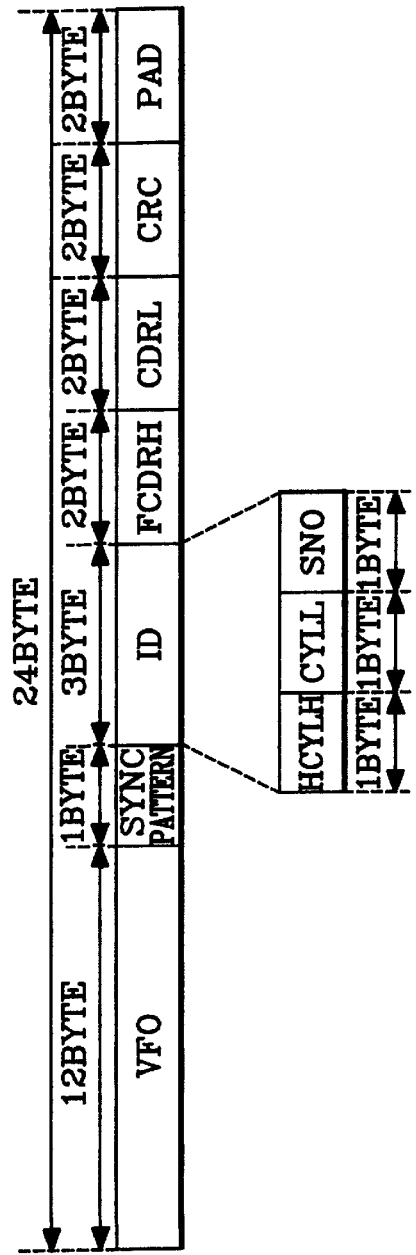
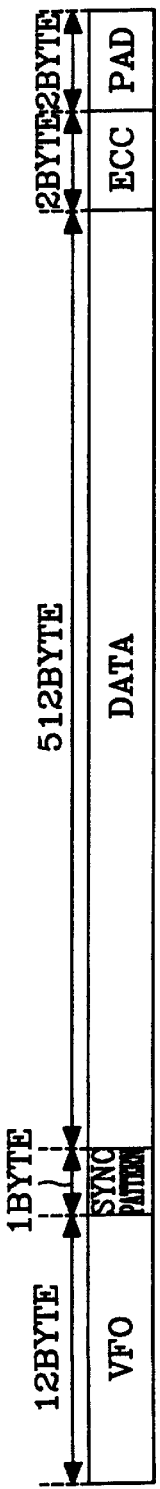
Fig. 2
Fig. 3
Fig. 4

| ADDRESS | LABEL | BRANCH | N_ADD/CNT | OT | GATE | FIELD | D_SEL | CONTENT |
|---|---|---|---|---|---|---|---|---|
| 00 | START | 0 1 0 | STOP | | 00 | 00 | 000 | INDEX PULSE WAITING |
| 01 | | 0 0 0 | 0B | | 10 | 00 | 000 | VFO FIELD WRITE |
| 02 | | 0 0 0 | 00 | | 10 | 10 | 001 | SYNC PATTERN WRITE/CRCINI GENERATE |
| 03 | | 0 0 0 | 00 | | 10 | 00 | 100 | HCYLH WRITE |
| 04 | | 0 0 0 | 00 | | 10 | 00 | 101 | CYLL WRITE |
| 05 | | 0 0 0 | 00 | | 10 | 00 | 110 | TSNO WRITE |
| 06 | | 0 0 0 | 00 | | 10 | 00 | 111 | FCDRH WRITE |
| 07 | | 0 0 0 | 00 | | 10 | 00 | 010 | CDRL WRITE |
| 08 | | 0 0 0 | 01 | | 10 | 00 | 011 | CRC WRITE |
| 09 | | 0 0 0 | 01 | | 10 | 00 | 000 | PAD WRITE |
| 0A | | 0 0 0 | 01 | | 10 | 00 | 000 | SPLICE |
| 0B | | 0 0 0 | 0B | | 10 | 00 | 000 | VFO FIELD WRITE |
| 0C | | 0 0 0 | 00 | | 10 | 01 | 001 | SYNC PATTERN WRITE/ECCINI GENERATE |
| 0D | | 0 0 0 | VECT2 | | 10 | 00 | 000 | DATA WRITE |
| 0E | | 0 0 0 | 0A | | 10 | 00 | 000 | ECC WRITE |
| 0F | | 0 0 0 | 00 | | 10 | 00 | 000 | PAD WRITE |
| 10 | | 1 1 1 | END | | 10 | 00 | 000 | TO END ON EOT ESTABLISHMENT/PAD WRITE |
| 11 | | 0 0 1 | START | | 11 | 00 | 000 | JUMP TO "START"/TSNO INCREASE/DSTC DECREASE |
| 12 | END | 0 0 1 | STOP | | 00 | 00 | 000 | |
| 13 | VECT2 | 0 0 0 | 01 | | 10 | 00 | 000 | PAD WRITE |
| 14 | | 0 1 0 | STOP | | 00 | 00 | 000 | EOS WAITING |
| 15 | | 0 0 0 | 0B | | 10 | 00 | 000 | VFO WRITE |
| 16 | | 0 0 0 | 00 | | 10 | 11 | 001 | SYNC PATTERN WRITE/RETURN |
| 17 | | | | | | | | |
| 18 | | | | | | | | |
| 19 | | | | | | | | |
| 1A | | | | | | | | |
| 1B | | | | | | | | |
| 1C | | | | | | | | |
| 1D | | | | | | | | |
| 1E | | | | | | | | |
| 1F | STOP= | | | | | | | |

2BYTE

Fig. 7

| ADDRESS | LABEL | BRANCH | N_ADD/CNT | OT | GATE | FIELD | D_SEL | CONTENT |
|---|---|---|---|---|---|---|---|---|
| 00 | START | 0 1 0 | STOP | | 00 | 00 | 000 | SECTOR PULSE WAITING |
| 01 | | 0 0 0 | 06 | | 01 | 00 | 000 | VFO FIELD READ |
| 02 | | 0 1 1 | START | | 01 | 10 | 001 | SYNC PATTERN WAITING/CRCINI GENERATE |
| 03 | | 0 0 0 | 00 | | 01 | 00 | 100 | HCYLH READ |
| 04 | | 0 0 0 | 00 | | 01 | 00 | 101 | CYLL READ |
| 05 | | 0 0 0 | 00 | | 01 | 00 | 110 | TSNO READ |
| 06 | | 0 0 0 | 00 | | 01 | 00 | 111 | FCDRH READ |
| 07 | | 0 0 0 | 00 | | 01 | 00 | 010 | CDRL READ |
| 08 | | 0 0 0 | 01 | | 01 | 00 | 011 | CRC READ |
| 09 | | 1 0 1 | STOP | | 00 | 00 | 000 | TO STOP ON CRC ERROR |
| 0A | | 1 0 0 | START | | 00 | 00 | 000 | TO START ON ID ERROR |
| 0B | | 1 1 0 | START | | 00 | 00 | 000 | TO START ON SKIP/AUTOMATIC STOP ON DEFECT |
| 0C | (READ) | 0 0 0 | 00 | | 00 | 00 | 000 | SPLICE |
| | (WRITE) | 0 0 1 | WRSEC | | 00 | 00 | 000 | TO WRSEC |
| 0D | | 0 0 0 | 06 | | 01 | 00 | 000 | VFO FIELD READ |
| 0E | | 0 1 1 | STOP | | 01 | 01 | 000 | SYNC PATTERN WAITING/ECCINI GENERATE |
| 0F | | 0 0 0 | VECT1 | | 01 | 00 | 000 | DATA READ |
| 10 | | 0 0 0 | 0B | | 01 | 00 | 011 | ECC READ |
| 11 | | 1 0 1 | STOP | | 00 | 00 | 000 | TO "STOP" ON ECC ERROR |
| 12 | | 0 0 1 | START | | 11 | 00 | 000 | JUMP TO "START"/TSNO++,DSTC-- |
| 13 | WRSEC | 0 0 0 | 0B | | 10 | 00 | 000 | VFO FIELD WRITE |
| 14 | | 0 0 0 | 00 | | 10 | 01 | 001 | SYNC PATTERN WAITING/ECCINI GENERATE |
| 15 | | 0 0 0 | VECT2 | | 10 | 00 | 000 | DATA WRITE |
| 16 | | 0 0 0 | 0B | | 10 | 00 | 011 | ECC WRITE |
| 17 | | 0 0 0 | 01 | | 10 | 00 | 000 | PAD WRITE |
| 18 | | 0 0 1 | START | | 11 | 00 | 000 | JUMP TO "START"/TSNO INCREASE, DSTC DECREASE |
| 19 | VECT1 | 0 1 0 | STOP | | 00 | 00 | 000 | EOS WAITING |
| 1A | | 0 0 0 | 06 | | 01 | 00 | 000 | VFO READ |
| 1B | | 0 1 1 | STOP | | 01 | 11 | 000 | SYNC PATTERN WRITE/RETURN |
| 1C | VECT2 | 0 0 0 | 01 | | 10 | 00 | 000 | PAD WRITE |
| 1D | | 0 1 0 | STOP | | 00 | 00 | 000 | EOS WAITING |
| 1E | | 0 0 0 | 0B | | 10 | 00 | 000 | VFO WRITE |
| 1F | STOP= | 0 0 0 | 00 | | 10 | 11 | 001 | SYNC PATTERN WRITE/RETURN |

2BYTE

Fig. 9

PROGRAMMABLE CONTROL SEQUENCER OF DISK CONTROLLER AND METHOD FOR MAP ALLOCATION THEREFOR

FIELD OF THE INVENTION

The present invention relates to a disk controller for use in a magnetic disk drive data storage system. More particularly, the present invention relates to a programmable control sequencer provided to the disk controller and a method for its map allocation.

DESCRIPTION OF THE RELATED ART

Typically, a disk controller applicable with a magnetic disk drive data storage system such as a hard disk drive (HDD) and a floppy disk drive (FDD), is provided with a programmable control sequencer to make control of a predetermined set of operation sequences for disk formatting or data reading and writing. Further, the disk controller not only serves to provide a kind of interfacing stage in between a host computer, a microcontroller unit within the disk drive storage system and a disk recording medium divided into a servo region and a data recording region, but also performs error detection and correction of data accessed during Read/Write operations.

In the aforementioned disk controller, the capability for an automatic operation is often strengthened to allow its local microcontroller unit to have less processing load, thereby allocating more time resources to any other functions of the local microcontroller unit, for example, such as a servo control, in which disk controller a programmable control sequencer is usually applicable so as to provide better application to the various specifications of disks used. The programmable control sequencer is provided with a program random access memory (RAM) for storing a microprogram therein and one or more peripheral circuits, causing an automatic sequence control to be carried out in accordance with either one of predetermined operations such as a power ON initialization or a Read/Write/Format operation under control of the microprogram loaded into the program RAM, wherein the microprogram should be down-loaded by the local microcontroller into the program RAM prior to every execution of such Read/Write/Format operation or upon each power ON reset.

As aforementioned, as the microcontroller should effect a down load of the appropriate microprogram into the program RAM upon every power ON reset or prior to every execution of Read, Write or Format operation, the overall operating efficiency of a disk drive storage system will be significantly dependent on a time duration necessary for such a down loading. Assuming that 1 clock period for a local microcontroller is a time T, its triple time 3T is normally required to write a program into a single RAM address. For example, each total time requirements according to two different sizes of program RAMs can be shown as follows:

(1) Using a CIRRUS disk controller with 31*4 byte program RAM (Model CL-SH5600),
 Total Time Required is 31*4*3T (=372T), and
(2) Using an ADAPTEC disk controller with 48 * 4 byte program RAM (Model AIC-8265),
 Total Time Required is 48*4*3T (=576T).

Therefore, from the above calculation, it will be appreciated that the work load of a local microcontroller unit required for down loading a given microprogram on every operation request should be significantly dependent upon the size of a program RAM, wherein for example the ADAPTEC model AIC-8265 disk controller requires more operating time by about 47% than the CIRRUS model CL-SH5600.

In the meanwhile, the size of program RAM can be determined by a sequencer map, which means topology of field allocation for a storage area in the program RAM, in which storage area corresponding to each address of the program RAM each instruction set is written to constitute a microprogram, said each instruction set being changeable depending on the field topology. Accordingly, in the programmable control sequencer, the size of a program RAM is determined according to the method of field allocation in the program RAM, and as a result, the size of program RAM will exert a great influence upon an overhead of the microcontroller affecting the performance of the disk drive storage system itself. Thus, necessity to reduce a size of the program RAM has been noted in the state of the art by trying better efficient allocation of the sequencer map.

SUMMARY OF THE INVENTION

It is therefore an object of the present invention to provide an improved programmable control sequencer and a method for its map allocation capable of considerably reducing the size of program RAM in a disk controller of a hard disk drive system.

It is another object of the present invention to provide a programmable control sequencer and a method for its map allocation capable of efficiently reducing a work load of a microcontroller in the disk controller system.

These and other objects can be achieved according to the principles of the present invention with a programmable control sequencer of a disk controller for use in a magnetic disk drive storage system, comprising:

a program random access memory (RAM) having a given number of byte size of storage area, provided with a sequencer map allocation comprising a branch field, a next address/count field, an output field, a gate field, a field region and a data selection field;

an address generator for generating an address for accessing said program random access memory in accordance with the information of said branch field and said next address/count field to thereby provide said address to said program random access memory;

a branch decoder for decoding said branch field information to provide the decoded information to said address generator;

a field decoder for decoding said field area information to provide the decoded information to said address generator;

a CDR counter for counting a value for CDR split by means of said field decoder to thereby control said address generator;

a timer for starting an operation according to a branch condition of said branch field and limiting the maximum operating time for said branch decoder;

a data selection circuit for selecting data read out from a data disk and a value of a data register in accordance with the information of said data selection field to therefrom compare said data with said value and for pushing the compared data into a stack;

a gating circuit for generating a Read/Write control signal to control operation of said disk and a signal to update a sector in accordance with the information of said gate field; and a sector updating circuit for executing the sector updating responsive to an output of said gating circuit.

According to another aspect of the present invention, it is disclosed a map allocation method for a programmable control sequencer having a program random access memory having a 32×2 byte size of data storage area in a disk controller for use in a magnetic disk drive storage system, said program random access memory being provided with a sequencer map allocation comprising in sequence:

branch field having either one of branch condition and count field enable information;

next address/count field selectively having a next address and/or a count value according to said branch condition;

output field being adaptable for testing synchronization outside said programmable control sequencer;

gate field being usable for performing a Read/Write gate control and making an increase of a target sector number and a decrease of a disk sector transmit count;

field region representing an ECC/CRC block and a CDR return; and data selection field be usable for comparing data selected from a given data register with data read out of the disk to thereby process the data according to the compared result.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 2 is a diagram illustrating the construction of data format in a conventional constant-density recording type of magnetic disk applicable in the present invention;

FIG. 3 is a diagram illustrating the detailed format of an ID field in FIG. 2;

FIG. 4 is a diagram illustrating the detailed format of a data field in FIG. 2;

FIG. 7 is a microprogram diagram illustrating a FORMAT mode of the programmable control sequencer according to the sequencer map allocation of FIG. 5;

FIG. 9 is a microprogram diagram illustrating a READ/WRITE mode of the programmable control sequencer according to the sequencer map allocation of FIG. 5;

DETAILED DESCRIPTION OF THE PREFERRED EMBODIMENTS

Hereinafter, the preferred embodiment of the present invention will be described in further detail with reference to the accompanying drawings, in which the various particular specifications including flow charts for control, a number of bits or bytes, logic levels, data formats, a microprogram, etc. may be illustrated for better understanding of the present invention. However, it should be noted that the present invention shall not be limited to those specifications set forth by way of an example only in the following embodiment. In addition, the programmable control sequencer of the present invention will be referred to as "sequencer" for the convenience of explanation.

Figure 1:
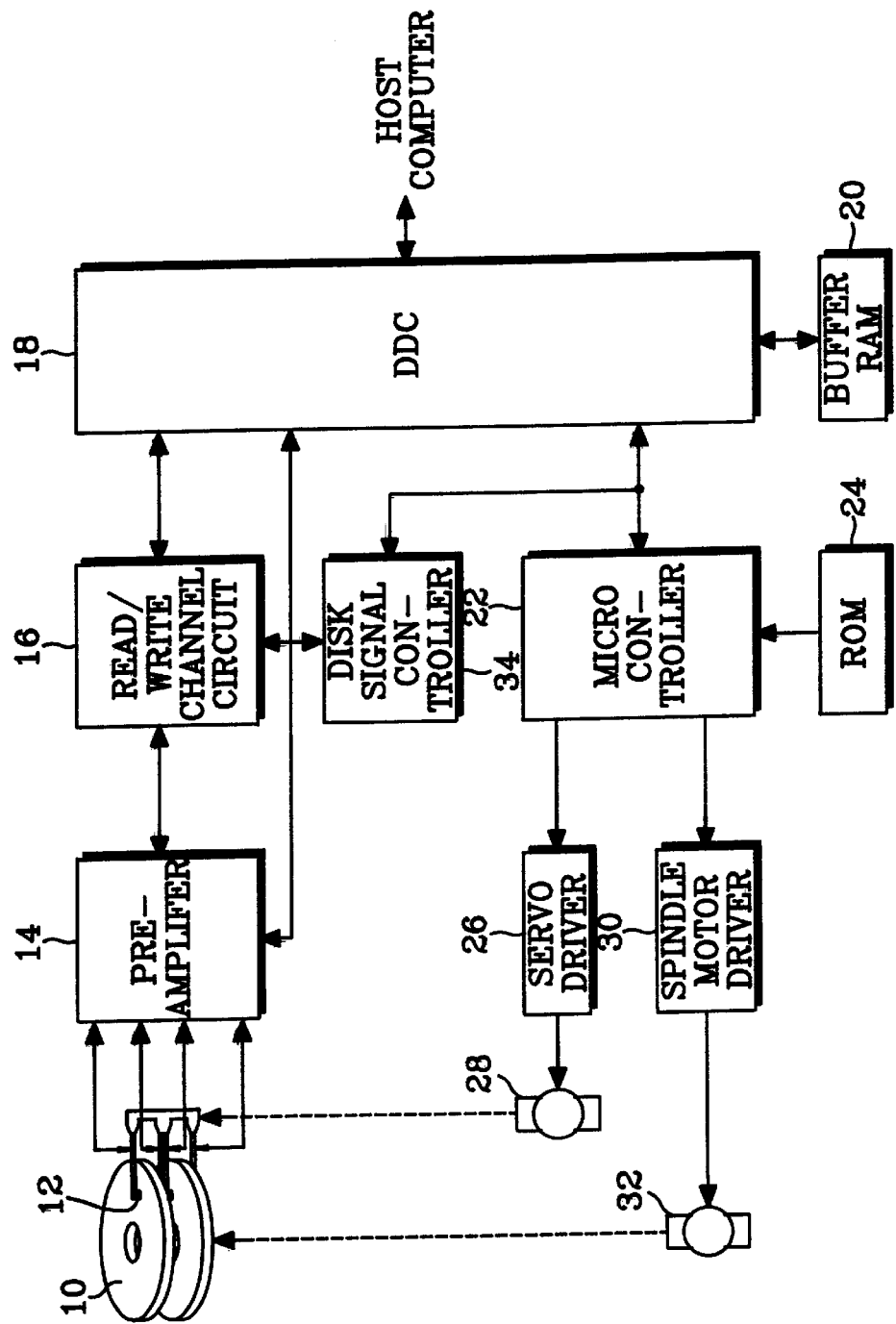
FIG. 1 is a block diagram illustrating an example of the construction of a conventional hard disk drive used in the present invention.

Turning now to the drawings, FIG. 1 is a block diagram illustrating the construction of a conventional hard disk drive (HDD) as a magnetic disk recording apparatus used in the present invention, wherein two data disks 10 and four read/write heads 12 installed with each disk surface are shown. Referring to the FIG. 1, a preamplifier 14 coupled to the heads 12 amplifies an analog read signal picked up by the heads 12 to apply the read signal to a read/write channel circuit 16, which circuit in turn during a write operation applies a write current according to any encoded write data to the heads 12 so as to record the write data onto the disks 10. The read/write channel circuit 16 detects a data pulse out of the read signal inputted from the preamplifier 14 and then decodes the data pulse to deliver the same pulse to a disk data controller 18 (hereinafter referred to as "DDC"), while the read/write channel circuit 16 serves to deliver the write data outputted from the DDC 18 to the preamplifier 14.

The DDC 18 is provided with a sequencer for performing a sequence of operations according to a microprogram down loaded from a microcontroller 22 and controls a read operation to get data out of the data disks for transmission to a host computer and a write operation to record data from the host computer onto the disks through the read/write channel circuit 16 and the preamplifier 14. Further, the DDC 18 serves as an interface for data communication between the host computer and the microcontroller 22, in which data communication a buffer RAM 20 temporarily stores the data transmitted therebetween.

The microcontroller 22 controls the DDC 18 in response to a Format/Read/Write instruction from the host computer, and also controls a track searching or track following operation. A read only memory (ROM) 24 stores an execution program for the microcontroller 22 as well as various preset values. A servo driver 26 generates a driving current for actuating an actuator 28 responsive to a control signal for position control of the heads 12 supplied from the microcontroller 22. The actuator 28 serves to move the heads 12 on the disks 10 in response to direction and level of the driving current of the servo driver 26. A spindle motor driver 30 drives a spindle motor 32 to rotate th disks in accordance with a control value for rotation control of the disks provided from the microcontroller 22. A disk signal controller 34 makes decoding of servo information from read data outputted from the read/write channel circuit 16 to deliver the encoded data to the microcontroller 22, and generates various control signals for read/write operation under control of the DDC 18 and the microcontroller 22 to thereby provide these control signals to the preamplifier 14, the read/write channel circuit 16 and the DDC 18. The disk signal controller 34 can preferably be provided with an ASIC (Application Specific Integrated Circuit) component designed to be better adapted to each HDD apparatus.

Referring now to FIG. 2, there is shown a diagram indicative of the construction of data format in a conventional type of Constant-Density Recording (hereinafter, referred to as "CDR") disk applicable in the HDD according to the present invention, in which a sector format of a single track is illustrated, with a rough scale, by way of example, having two split data sectors provided with a complete data sector and another data sector adjacent to the complete data sector between servo fields. This CDR format is also known as a Zone-Bit Recording (ZBR) format in the art.

According to the known CDR format, an information recording region on a disk is generally divided into a multiplicity of zones having a constant recording density in a radial direction from the center of the disk, wherein a number of data sectors in tracks of each zone is assigned differently from each other, so that tracks in an outer circumferential zone have more data sectors than tracks in an inner circumferential zone. The data sector is intended to designate an unit area to make data access on a disk in the magnetic disk recording apparatus, and has an identical size irrespectively of any positions on the disk, for example, 512 bytes of size. In case that an embedded sector servo system, which is one of various known methods for providing a magnetic disk recording apparatus with the position information for heads, is adopted as servo control, one data sector can be divided into two segments according to each zone in the disk, in which servo system each track is divided into a servo information region and a data information region provided alternatively in a circumferential direction, wherein the servo information region is a servo field for recording servo information and the data information region is an area for recording actual data providing data sectors.

Referring again to FIG. 2, data sectors each are divided into a identification (ID) field and a data field, in which the ID field includes a header having the information for identification of a corresponding data sector and the data field following the ID field is used for recording digital information.

FIG. 3 illustrates a further detailed format of an ID field, which includes a Variable Frequency Oscillator (VFO) region of 12 bytes as an identification preamble that is a synchronization signal used for clock synchronization during reading the ID field. A synchronization pattern of 1 byte follows the VFO region as an ID address mark and is also provided with a particular data pattern, for example, "A5" (in hexadecimal value) in order to once again identify the ID region having information regarding the position or characteristic of the respective data sector existing in a corresponding data information region, thereby informing a subsequent ID region consisting of a head number HCYLH, a cylinder number CYLL and a sector number SNO, all of these three numbers being of 1 byte respectively, wherein the HCYLH includes a head position information, the CYLL a cylinder position information for track identification, and the SNO a sector number of the data sector following the ID field. These head number, cylinder number and sector number will be a kind of physical identification information identifying a number of the data sector with the current head position. In case where a single head and a single sided disk are used in a magnetic disk recording apparatus, the head/cylinder number of the ID information can be omitted in the ID region. Next regions Additional Data Sector Information/Split Information Upper (FCDRH) and Data Sector Information/Split Information Low (CDRL) each are of 2 bytes, and include various information such as the position information indicative of a position of each data sector existing within a corresponding data information region, the information regarding the split of a following data sector, the usability information regarding the data sectors, and the split information regarding starting data sector in the corresponding data information region as split information for the Constant-Density Recording system. This split information allows data access to a split data sector. A next region CRC (Cyclic Redundancy Code) is also of 2 bytes and serves as an error detection code for error detection and correction checking from the ID region through the CDRL region of the ID field. The last region PAD is a postamble of the ID field to serve as a gap for a following data field.

Referring now to FIG. 4, a diagram illustrating the detailed format of the data field, it comprises a VFO region of 12 byte data preamble, a synchronization pattern as a data address mark, an actual data stream of 512 bytes, an ECC region and a postamble data PAD. The data preamble is positioned between the ID postamble and the synchronization pattern data, to provide the clock synchronization in a reading operation for the data field as well as a field gap between the ID field and the data field. The synchronization pattern identifies a starting point of data stream to thereby provide a kind of synchronization necessary when reading the digital data stored in the magnetic disk recording apparatus. The ECC data is an error detection code for error detection and correction for the data address mark and the stored data. The postamble provides a. timing margin required after the data reading operation.

Figure 5:
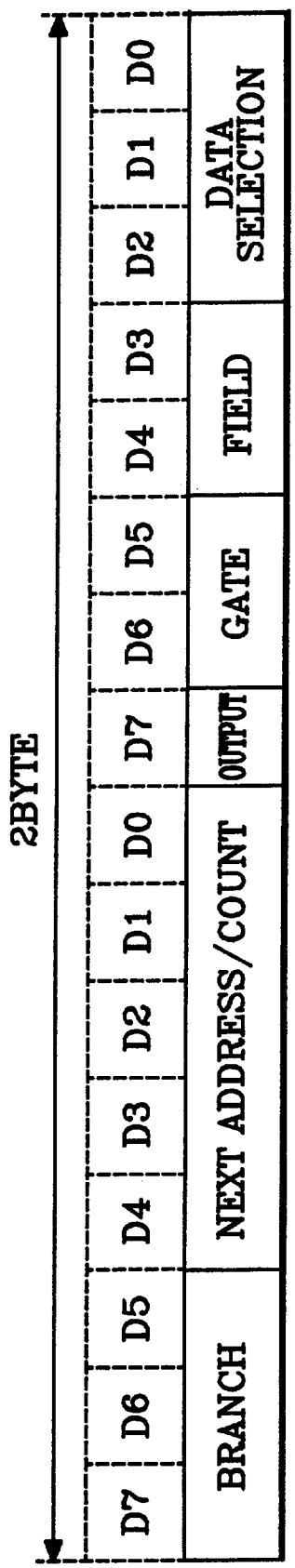
FIG. 5 is a diagram illustrating the allocation format of a sequencer map according to the present invention.

Referring now to FIG. 5, there is shown the allocation format of a sequencer map according to the present invention, applicable with the aforementioned field and data formats in the HDD of FIG. 1, wherein the format shows the allocation status of a storage region corresponding to each address with respect to a program RAM. Like allocation format is made to other storage regions corresponding to the remaining addresses. An instruction of 2 bytes comprises a branch field, a next address/count field, an output field, a gate field, a field region, and a data selection region.

The branch field consisting of the upper 3 bits D7–D5 of the above mentioned 2 bytes is used for a branch condition or for enabling a count field, in which, for example, in case of the count field enable "000" a next address/count field is used as a count value, while in case of other branch condition the next address/count field is used as a next address. Various functions defined by the 3-bit code combination of the branch field D7–D5 are as follows.

In case that the branch field code is "000", it represents the count field enable status for a next address/count field to be used as a count value, in which if a counter is in a carry-out status, then a program counter PC increases by 1, and if not, the program counter PC remains same. Then, in case that the branch field code is "001", it always performs branching, thereby jumping to a next address, in which the program counter PC indicates the next address.

When the branch field code is "010", it awaits an index pulse, a sector pulse and/or an end of servo (EOS) signal, in which in the index mode, if it times out in second cycle, then the program counter PC indicates the next address, wherein if the index pulse is detected, then the program counter PC increases by 1, or if not, then the program counter PC remains same. In the sector mode, if it times out in second cycle, then the program counter PC indicates the next address, and if the sector pulse is detected, then the program counter PC increases by 1, or if not, then the program counter PC remains same. Further, in the CDR mode, if it times out in second cycle, then the program counter PC indicates the next address, and if the EOS is detected, then the program counter PC increases by 1, or if not, then the program counter PC remains same.

When the branch field code is "011", it awaits detection of synchronization, in which if the synchronization times out, then the program counter PC indicates the next address, and if the synchronization is detected, then the program counter PC increases by 1, or if not, then the program counter PC remains same. Meanwhile, in case that the branch field code is "100", it branches on an ID error/buffer error. Here, if it is the ID error, then the program counter PC indicates the next address, and if it is the ID error in a status of buffer error, i.e., "buffer full" or "buffer empty", then the program counter PC indicates the next address, and if not, then it automatically stops. If it is not the ID error/buffer error, then the program counter PC increases by 1.

In case that the branch field code is "101", it branches on CRC error/ECC error, in which if it is the CRC/ECC error, then the program counter PC indicates the next address, and if not, then the program counter PC increases by 1. Then, in case that the branch field code is "110", it branches on a recording medium (i.e., disk) defect, wherein if it is a skip status, then the program counter PC indicates the next address, and if it a defect status, then the program counter PC increases by 1.

Further, in case that the branch field code is "111", it branches on an EOT status, wherein if it is the EOT, then the program counter PC indicates the next address, and if not, then the program counter PC increases by 1.

The next address/count field consisting of the lower 5 bits D4–D0 of the first byte set forth in FIG. 5 is used as a next address or a count value according to the branch condition provided. The output field consisting of the uppermost 1 bit D7 of the second byte set forth in FIG. 5 serves as an output pin for testing the synchronization from the outside.

The gate field consisting of the upper 2 bits D6–D5 of the second byte is used as information for Read/Write gate control, increase of Target Sector Number (TSNO) and decrease of Disk Sector Transfer Count (DSTC), in which the TSNO and DSTC updating function is required to perform a multi-sector Read/Write operation irrespectively of the microcontroller. In the gate field code, if it is "00", it indicates no operation, and then the code "01" indicates a Read gate (RG) "set", the code "10" a Write gate (WG) "set", and the code "11" the increase of TSNO and the decrease of DSTC, respectively.

Next, the field region consisting of the lower 2 bits D4–D3 of the second byte is used to represent an ECC/CRC block or a CDR return, in which field code if it is "00", then it indicates no operation, and the code "01" initialize the ECC block for data field, the code "10" initialize the CRC block for ID field, and the code "11" returns from the CDR processing. At this time, the current address is stored in the program counter PC and the current value is again stored as a counter value.

The data selection field consisting of the lowermost 3 bits D2–D0 of the second byte set forth in FIG. 5 is used to compare non-return-to-zero (NRZ) data of a disk with data selected from the following various data registers, thereby processing the compared data as necessary. According to a 3-bit code combination of this data selection field, if the code is "000", then it designates VFO/PAD/SPLICE/NOP and in Write mode the immediate value is "00". Further, if the code is "001", then it designates a synchronization register, that is, a sync pattern. If the code is "010", then it designates a CDRL register, that is, "Split Information Low". If the code is "011", then it designates a CRC/ECC value, that is, "End of CRC/ECC Generation/Checking. If the code is "100", then it designates a HCYLH register, and is compared with the NRZ data, sets a COMPARE_RESULT_FLAG and performs an automatic PUSH. If the code is "101", then it designates a CYLL register, and is compared with the NRZ data, sets a COMPARE_RESULT_FLAG and performs an automatic PUSH. If the code is "110", then it designates a TSNO register, and it is compared with the NRZ data, sets a COMPARE_RESULT_FLAG and performs an automatic PUSH. If the code is "111", then it designates a FCDRH register, and it extracts flags (Split2, Skip, Defect, EOT, etc.) and performs an automatic PUSH.

Figure 6:
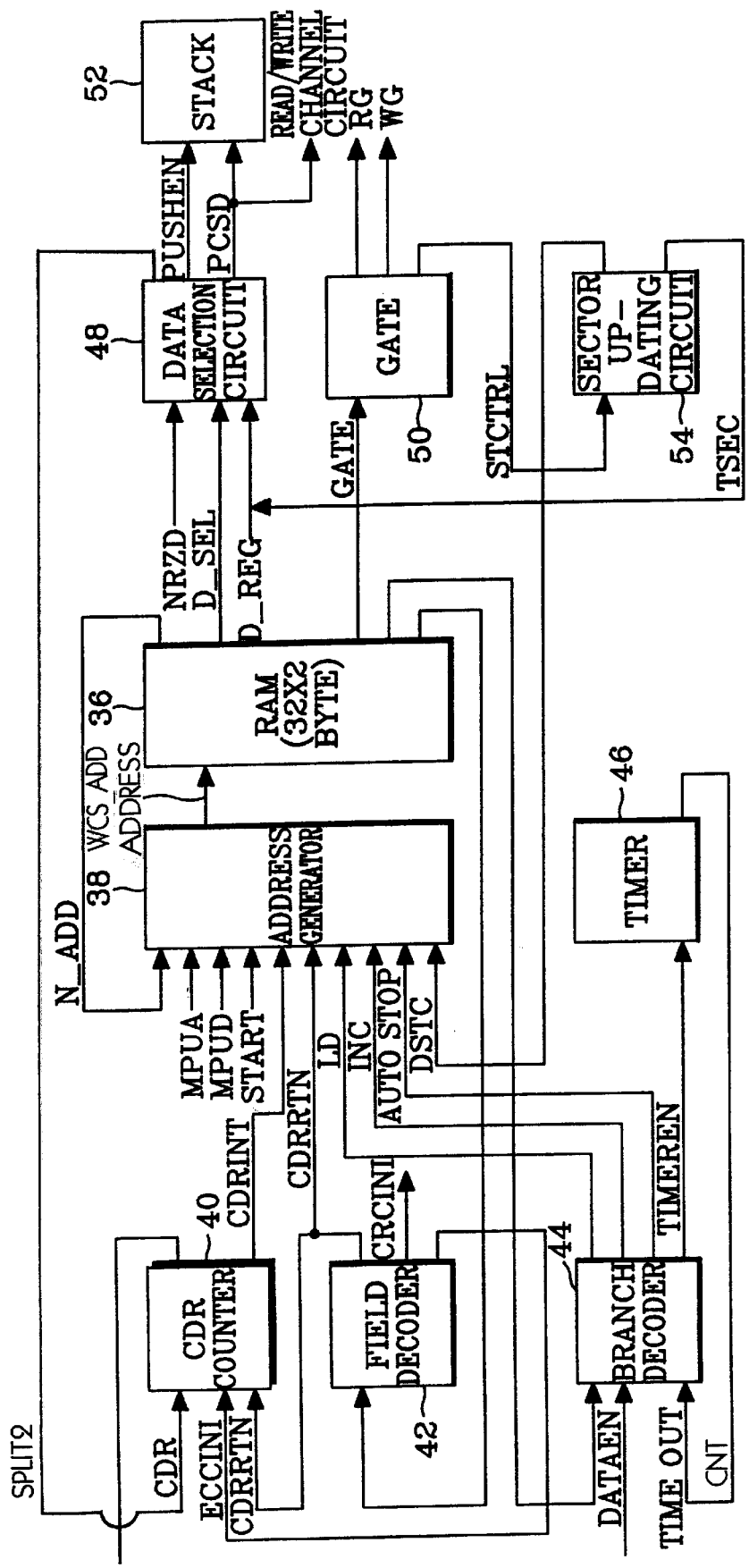
FIG. 6 is a block diagram of a programmable control sequencer according to the sequencer map allocation of FIG. 5 and the data format of FIG. 2 according to the present invention.

FIG. 6 illustrates a block diagram of a programmable control sequencer on basis of the sequencer map allocation set forth in FIG. 5 and the aforementioned data format of FIG. 2 in accordance with the present invention. A program RAM 36 of the sequencer provided to the DDC 18 according to the above sequencer map allocation is of 32×2 byte size. An address generator 38 generates a RAM address according to the program counter PC in consideration of the status of signals CDRINT, CDRRTN, LD, INC, etc., in which if DSTC is "0", an automatic stop occurs, and a next address is "1F", then the signal LD is generated to stop operation of the sequencer. Among these stop conditions, in a CDR subroutine, if the RAM address increases from "1E" to "1F", then the normal operation is made, and in case of jumping (LD) into "1F" in other address, a stop condition is used. A CDR counter 40 starts operation by a signal "ECCINI", generates the signal CDRINT if the CDR value is same as a CNT (TIME OUT) result, and then it halts operation till generation of the signal CDRRTN. If the flag SPLIT2 is set, then it is generated the signal CDRINT at the second time after a lapse of a preset value following generation of the first CDRRTN. A signal DATAEN is kept "high" during a time period in which the CDR COUNTER 40 is operating, and it invalidates the branch condition in a data period. A branch decoder 44 generates signals LD and INC that acts as a reference signal of a next address by checking the branch condition, a corresponding signal and a status of a timer 46, which starts operation responsive to the branch condition and limits the maximum operating time. A data selection circuit 48 compares data read out from the disk with a value of the data register selected, and makes a signal PUSHEN to store into a stack 52 the information such as HCYLH, CYLL, TSNO, FCDRH of the read data. A gate 50 generates read/write signals to control disk operation or a sector updating signal, by which signal a sector updating circuit 54 carries out the updating operation irrespectively of the microcontroller 22.

Now, taking into account the microprogram formed of the sequencer map allocation as set forth in FIG. 5, further detailed description regarding the operation of the programmable control sequencer with the HDD construction of FIG. 1 will be made with reference to the aforementioned sequencer map and the following flow charts, in which for convenience' sake the description will be divided into Format Mode, Read Mode and Write Mode that are major operating modes in the HDD.

Format Mode

Referring to FIG. 7, there is shown a microprogram diagram for a Format Mode of the programmable control sequencer according to the sequencer map allocation of FIG. 5, wherein a column "ADDRESS" indicates the RAM address, "BRANCH" indicates the branch field of FIG. 5, "N_ADD/CNT" indicates the next address/count field, "OT" indicates the output field, "GATE" indicates the gate field, "FIELD" indicates the field region, and "D_SEL" indicates the data selection field.

Figure 8A:
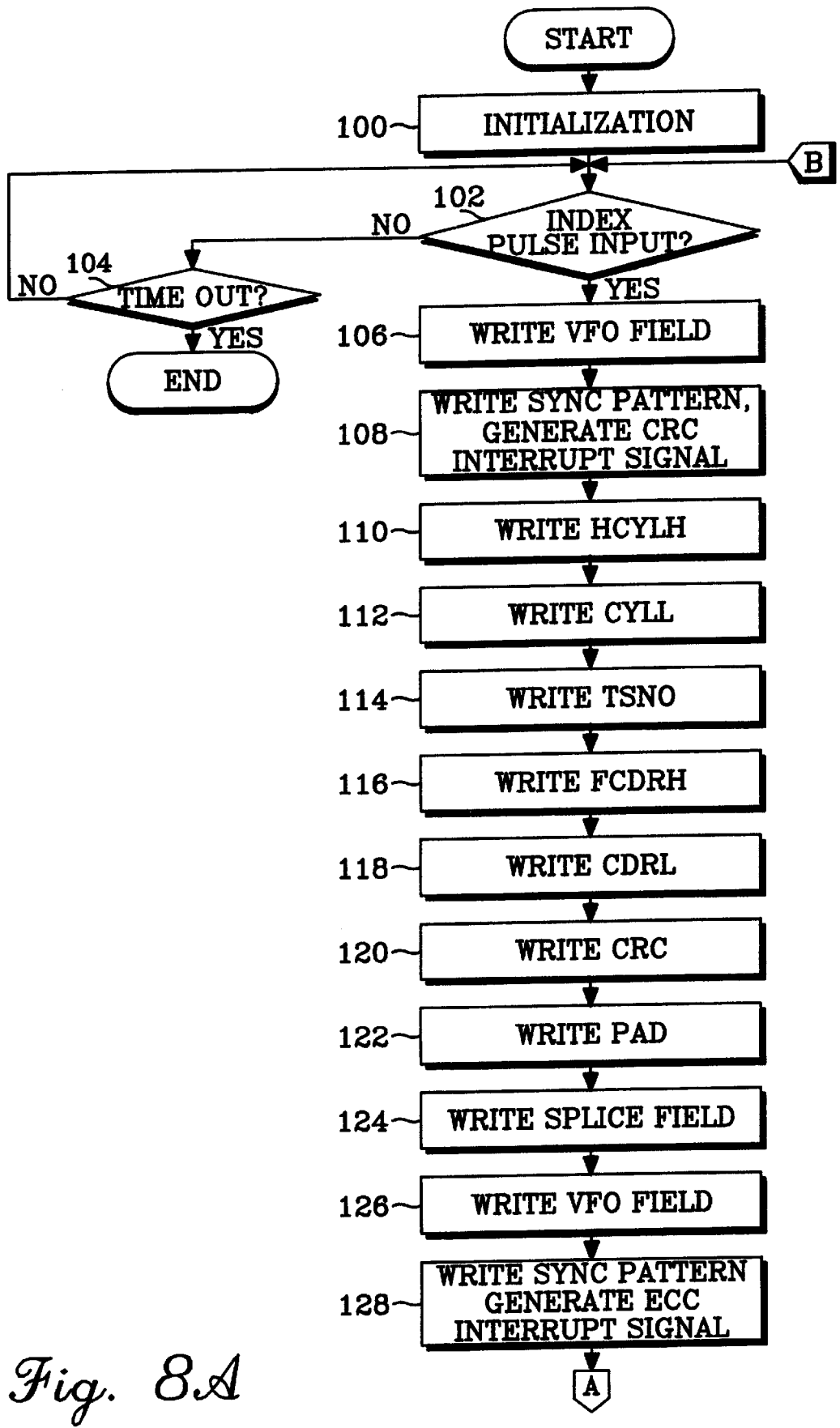
FIGS. 8A and 8B are flow charts illustrating the control steps for the programmable control sequencer in the FORMAT mode of FIG. 7.
Figure 8B:
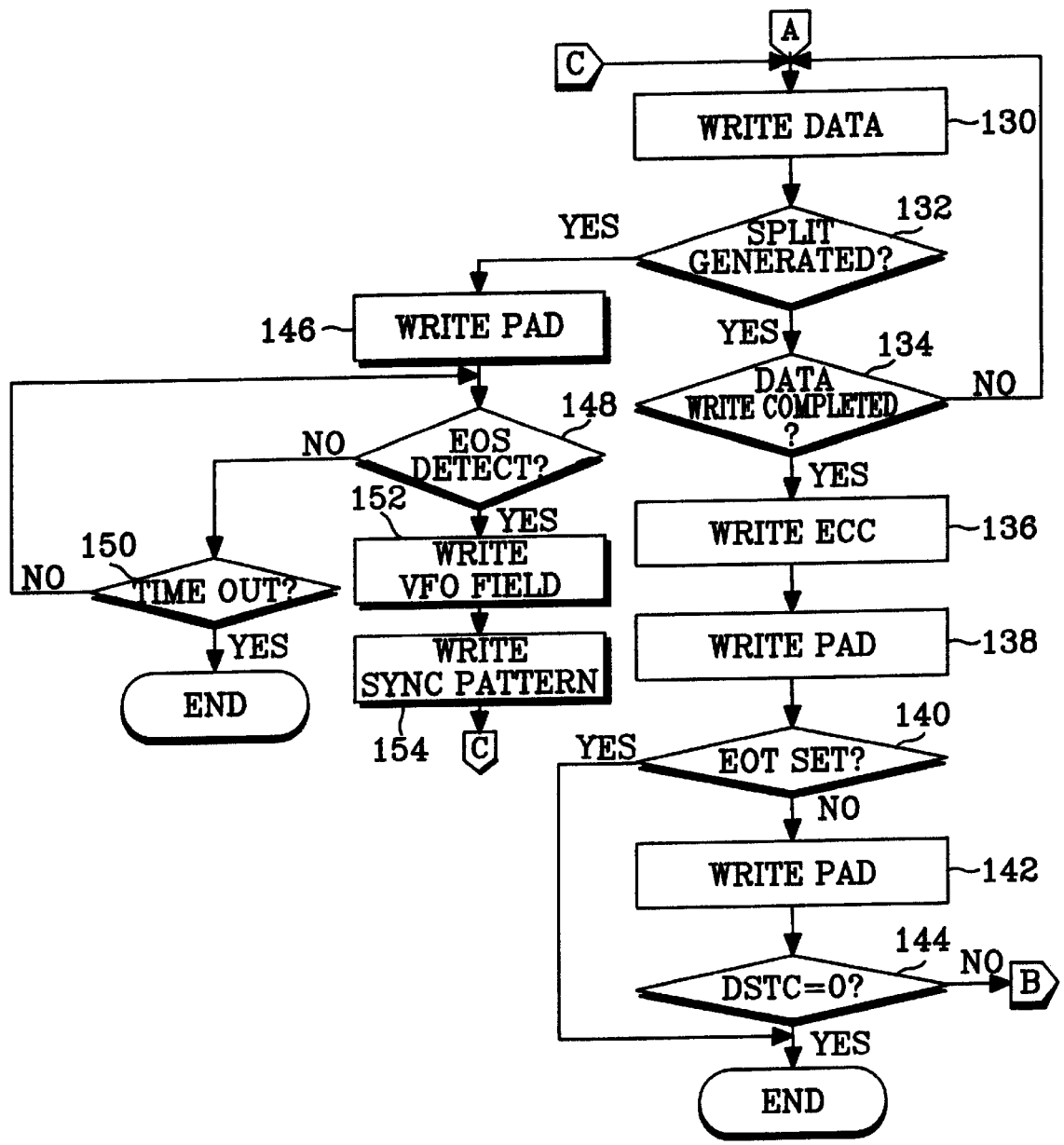

Referring to FIGS. 8A and 8B taken together, there is shown the flow chart of the processing control steps for the programmable control sequencer in the FORMAT mode of FIG. 7. The operation of the flow chart will be controlled by the sequencer set forth in FIG. 6.

At first, in step 100 of FIG. 8A the initialization is performed as follows. The maximum index searching time is set in timer 46, and then, the value "TSNO" to start a disk operation as well as the value "DSTC" designating a number of times of the disk operation is written. Further, the microcontroller 22 writes a microprogram as shown in FIG. 7. The address generator 38 receives address "MPUA" and data "MPUD" to write the same into RAM 36. Once the microcontroller 22 writes the starting address for RAM, the address generator 38 generates addresses and enables the sequencer to start the operation.

The timer 46 is then enabled in steps 102 to 104 corresponding to the address "00"(hereinafter, in hexadecimal) of FIG. 7, and the index pulse is awaited. The data selection circuit 48 selectively providing a plurality of input data outputs data "00" since data selection field is "000". At this time, if the index pulse is inputted, then it proceeds to the address stage "01" or if the index pulse is not inputted, then it keeps the current address stage "00". If the index pulse is not inputted till the timeout, that is, a value "1" is outputted, then it generates an automatic stop signal by a combination of address "1F" and signal "LD", and the address generator 38 stops generation of addresses, thereby quitting the operation of the sequencer.

In step 106 corresponding to the address stage "01", a timer enable signal TIMEREN is delivered from the branch decoder 44 to the timer 46, in which a counter in the timer 46 continues to output value "00" till it reaches a next address/count field value. Thus, after writing 12 bytes of the value "00" into the VFO field of the ID field as shown in FIG. 3, it proceeds to a next address stage "02" by INC. In step 108 corresponding to the address stage "02", one byte of the sync pattern is written on the disk 10 and the CRC interrupt signal CRCINI is generated for fixing the timing interval for a CRC checking.

In step 110 corresponding to the address stage "03", one byte data of the HCYLH is written on the disk 10, and in step 112 corresponding to the address stage "04" one byte data of the CYLL is written on the disk. Further, in step 114 corresponding to the address stage "05" one byte data of the SNO according to TSNO is written on the disk, and in step 116 corresponding to the address stage "06" two byte data of the FCDRH is written on the disk. Furthermore, in step 118 corresponding to the address stage "07" two byte data of the CDRL is written on the disk, and in step 120 corresponding to the address stage "08" two byte data of the CRC is written on the disk. In the meanwhile, in step 122 corresponding to the address stage "09" two byte data of value "00" is written as PAD on the disk, and in step 124 corresponding to the address stage "0A" two byte data of "00" is written on the disk, thereby performing the splice between the ID field and the data field.

In step 126 corresponding to the address stage "0B", 12 bytes of value "00" is written into the VFO field of data field on the disk 10 as shown in FIG. 4, and in step 128 corresponding to the address stage "0C" the sync pattern is written on the disk and the signal ECCINI is generated to set an ECC checking area. At this time, the CDR counter 40 generates the signal DATAEN indicating that the data region begins at the next stage. Further, in steps 130 to 134 corresponding to the address stage "0D", if the split should not occur in the data area, then data is continuously written on the disk until the count value of the CDR counter 40 reaches 512 and thereafter, it proceeds to an address "0E". The branch condition "000" is invalidated in the data region. If a split is generated in the data region, then the CDR counter 40 maintains the current count value, generates the signal CDRINT and selects the next address stage, thereby proceeding to the address stage "13". The CDR counter 40 compares a number of data bytes with the CDR value, and if the both are same, then it generates the CDRINT. The address generator 38 stores the current stage upon generation of the CDRINT and generates the next address "N_ADD". The CDR counter 40 keeps the current value during processing of the CDRINT, and after processing of the CDRINT starts to again count the number of data, thereby processing a total of 512 bytes of data before proceeding to the next stage. Describing further the CDR procedure performing a servo skipping during Format Mode, the CDR interrupt is generated to store the current WCS_ADD (ADDRESS) and count value, and the control jumps to an address "13" of FIG. 7, namely, to VECT2. Then, the control is returned to the main routine and the current WCS_ADD and count value is stored.

Next, in step 136 corresponding to the address stage "0E", 12 bytes of ECC data are written on the disk, and in step 138 corresponding to the address stage "0F", two byte data of value "00" as PAD is written on the disk. In steps 140 to 142 corresponding to the address stage "10", if it is set the END OF TRACK (EOT) indicating the last sector of a track, then it proceeds to a next address stage. Here, if it is not the last sector, then the value "00" is written on the disk as PAD and proceeds to a next stage. In the meanwhile, in step 144 corresponding to the address stage "11", the comparison with the current DSTC value is made, in which comparison if it is "0" then it means completion of the format operation for intended sectors, and therefore, the sequencer controls to stop generation of addresses in the address generator 38 and to end the execution. However, if the DSTC value is not "0", then the sector updating circuit 54 performs the TSNO increase and the DSTC decrease and it proceeds to the address stage "00". In address stage "12", the address generator 38 stops generation of the addresses and the sequencer stops the operation.

In step 146 corresponding to the address stage "13", it is the case that a split occurs in the data region, so two byte data of "00" is written on the disk as PAD, and then it proceeds to a next address "14". Further, in steps 148 to 150 corresponding to the address stage "14", the timer 46 is enabled and the current status is kept till detection of the EOS. Here, if the EOS is detected, then it proceeds to a next address "15", while if it is timeout, then the operation ends by an automatic stopping.

In step 152 corresponding to the address stage "15", 12 bytes of value "00" are written on the disk as PAD, and in step 154 corresponding to the address stage "16", the sync pattern is written and the control proceeds to the address stage "0B" that is the original position that the CDRINT was generated in the address generator 38 by the CDRRTN having a priority that is not the branch condition. Therefore, it will be appreciated that the disk format operation is carried out as aforementioned.

The stack 52 store the information HCYLH, CYLL, TSNO and FCDRH by the signal PUSHEN in case that the most significant bit of the data selection field is "1", namely, in the address stages "03", "05" and "06".

Read Mode

Referring to FIG. 9, there is shown a microprogram diagram for a Read/Write Mode of the programmable control sequencer according to the sequencer map allocation of FIG. 5, wherein in the diagram a column "ADDRESS" indicates the RAM address for RAM 36, "BRANCH" the branch field of FIG. 5, "N_ADD/CNT" the next address/count field, "OT" the output field, "GATE" the gate field, "FIELD" the field region, and "D_SEL" the data selection field.

Figure 10A:
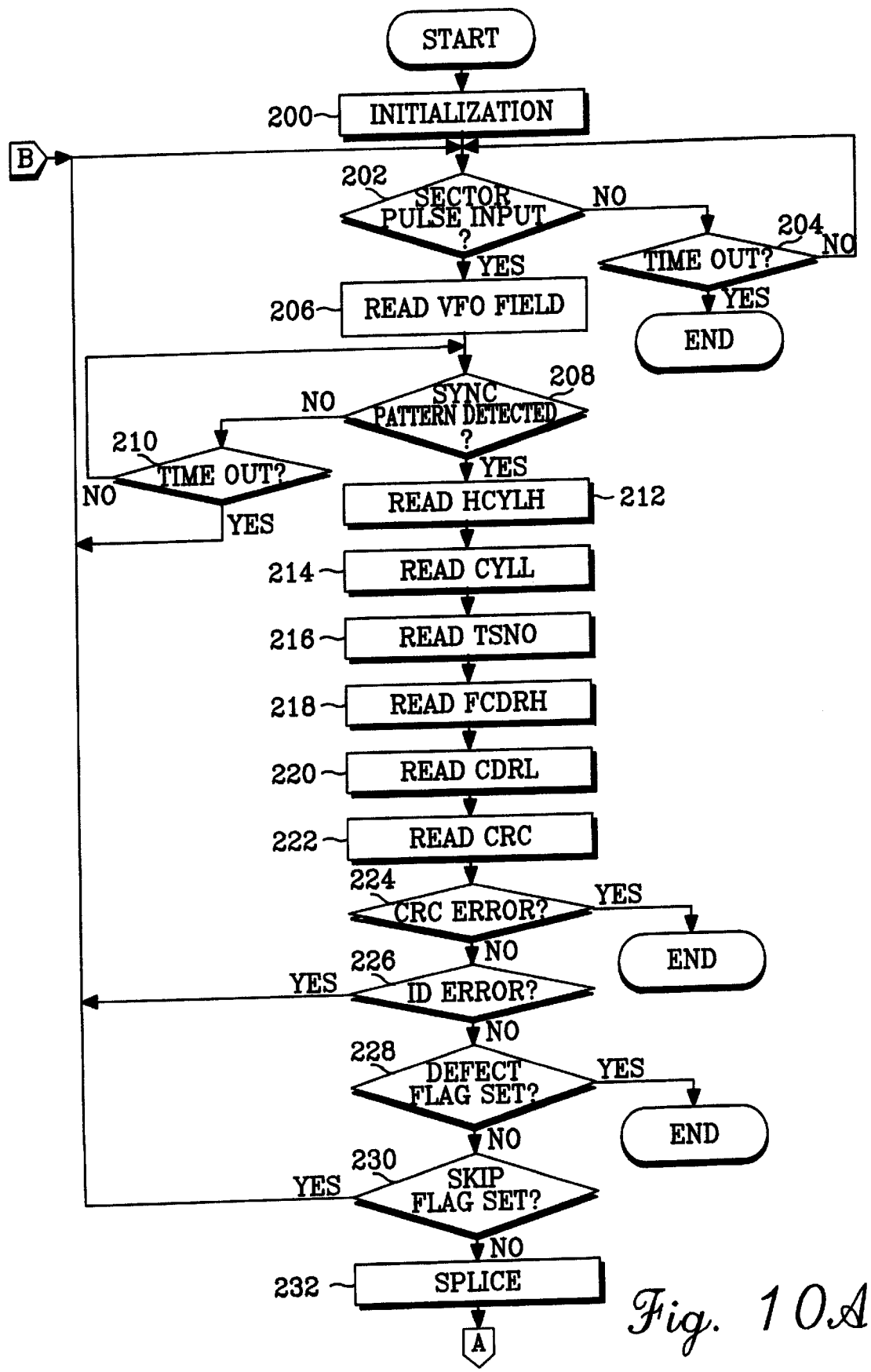
FIGS. 10A and 10B are flow charts illustrating the control steps for the programmable control sequencer in the READ mode of FIG. 9.
Figure 10B:
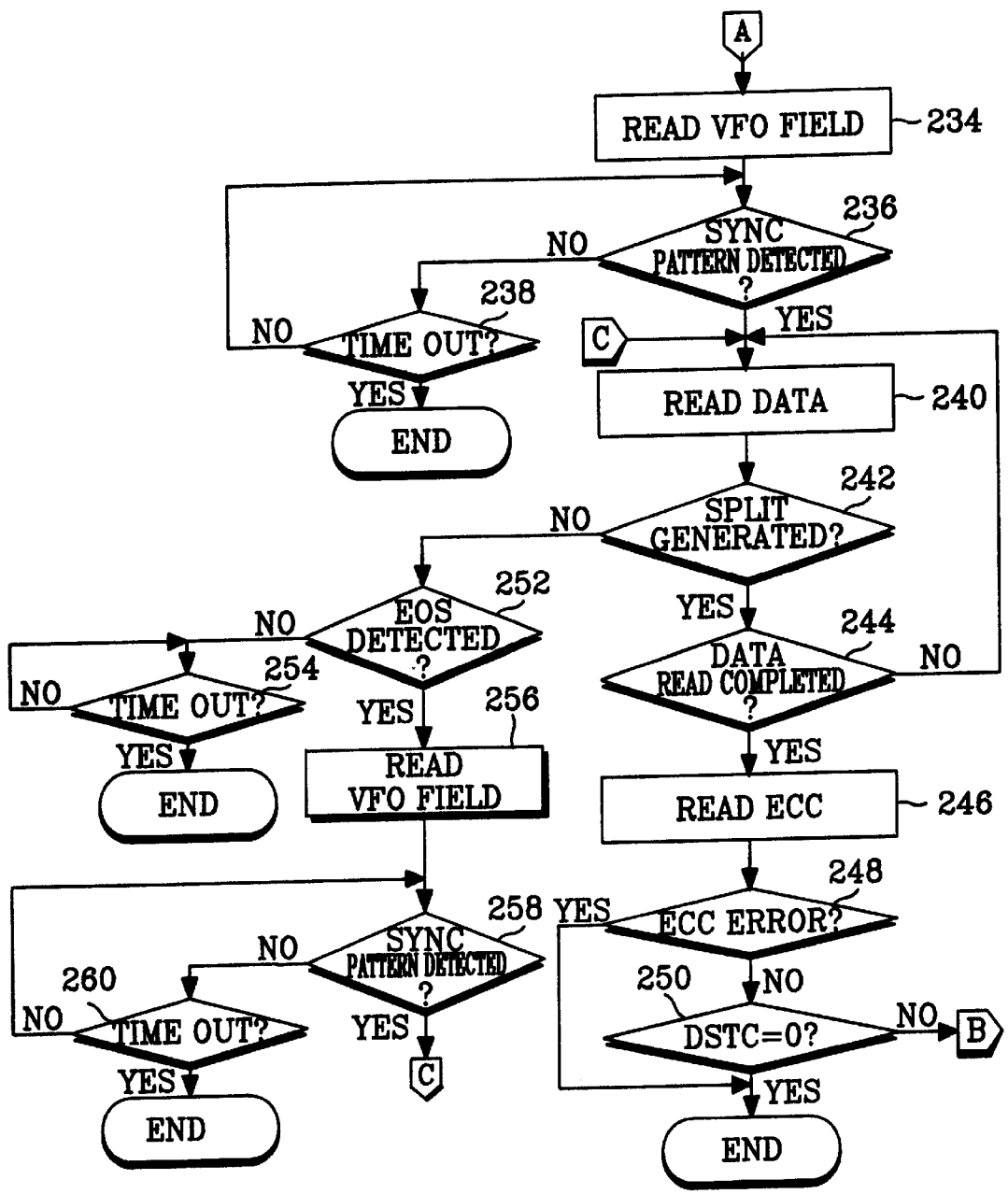

Referring to FIGS. 10A and 10B taken together, there is shown the flow chart defining the control steps for the programmable control sequencer in the Read mode of FIG. 9. The execution of the flow chart is controlled by the sequencer shown in FIG. 6.

First of all, in step 200 of FIG. 10A, the initialization procedure is performed as follows. The maximum time of index searching is set in timer 46, and then, the values TSNO, HCYLH and CYLL to start the disk operation as well as the value "DSTC" designating a number of times of the disk operation and the maximum time till reading the sync pattern are written into the disk. The microcontroller 22 writes a microprogram prior to the disk operation, as shown in FIG. 9. The address generator 38 receives address "MPUA" and data "MPUD" to write the same into RAM 36. Once the microcontroller 24 writes the starting address for RAM, the address generator 38 begins to generate addresses and enables the sequencer to start the operation.

Subsequent to the initialization, the timer 46 is then enabled in steps 202 to 204 corresponding to the address "00" of FIG. 9, and the sector pulse is awaited. The data selection circuit 48 selectively delivering a plurality of input data outputs data "00" since its data selection field is "000". At this time, if the sector pulse is inputted, then it proceeds to the address stage "01" by the signal INC, or if the sector pulse is not inputted, then it keeps the current address stage "00". Here, if the sector pulse should not be inputted till the timeout, that is, when a value "1" is outputted, then it generates an automatic stop signal by a combination of a next address "1F" and the signal LD, so that the address generator 38 stops generation of addresses, thereby ending the operation of sequencer.

In step 206 corresponding to the address stage "01", a timer enable signal TIMEREN is delivered from the branch decoder 44 to the timer 46, in which a counter within the timer 46 continues to read the value "00" till it reaches a next address/count field value. Thus, after reading 7 bytes of the value "00" from the VFO field of the ID field in the disk as shown in FIG. 3, it proceeds to a next address stage "02" by the INC. In steps 208 to 210 corresponding to the address stage "02", a sync counter within the timer 46 is enabled and it is awaited till detection of the sync pattern. At this moment, if the timeout occurs, it proceeds to the address stage "00", and if the sync pattern is detected, then it proceeds to the address stage "03". Further, the CRC interrupt signal CRCINT is generated to set an area for CRC checking of the ID section.

In step 212 corresponding to the address stage "03", the data HCYLH of FIG. 3 is read out from the disk 10 to compare with an HCYLH to read. In step 214 corresponding to the address stage "04", the data CYLL of FIG. 3 is read out from the disk to compare with a CYLL to read. In step 216 corresponding to the address stage "05", the data TSNO of FIG. 3 is read out from the disk to compare with a TSNO to read. In step 218 corresponding to the address stage "06", the data FCDRH of FIG. 3 is read out from the disk. to read. In step 220 corresponding to the address stage "07", the data CDRL of FIG. 3 is read out from the disk, and in step 222 corresponding to the address stage "08", the data CRC of FIG. 3 is read out from the disk.

In step 224 corresponding to the address stage "09", the data CRC read out from the disk 10 is compared to CRC data internally generated, in which if there is found an error, then it stops the operation, and if not, then it proceeds to the address stage "0A". In the data selection circuit 48, it is checked whether the CRC data read out from the disk is different from the internal generated data, thereby transmitting the checked result to the branch decoder 44 so as to generate therein the signals LD or INC. In step 226 corresponding to the address stage "0A", if the values at the address stages "03", "04" and "05" are all the same to each other, then it means that a target to read has been found, thereby proceeding to the address stage "0B", while there is found any error, then it proceeds to the above address "00" in order to compare with the next sector. In steps 228 to 230 corresponding to the address stage "0B", if the defect flag that is the upper bits of the FCDRH is 'set', then it generates the automatic stop, and if the skip flag is 'set', then it proceeds to the address stage "00", otherwise it proceeds to the address stage "0C". In step 232 corresponding to the address stage "0C", the splice operation is performed. In step 234 corresponding to the address stage "0D", the timer enable signal TIMEREN is delivered from the branch decoder 44 to the timer 46, in which a counter in the timer 46 continues to read the VFO field of FIG. 4, namely, the value "00" till it reaches the next address/count field value. Thus, after reading 7 bytes of the value "00" from the VFO field it proceeds to the address stage "0E" by the INC. Then, in steps 236 to 238 corresponding to the address stage "0E", the sync counter in the timer 46 is enabled and it awaits till detection of the sync pattern, in which case if the timeout occurs, then it stops the operation, and if the sync pattern is detected, then it proceeds to the address stage "0F". Further, the signal ECCINI is generated to assign an area for ECC checking of the data section and then, the CDR counter 40 generates the signal DATAEN indicating that the data region begins at the next stage.

Next, in steps 240 to 244 corresponding to the address stage "0", if the split should not occur in the data region, then data as seen in FIG. 4 is continuously read out of the disk until the count value of the CDR counter 40 reaches a number 512 and thereafter, it proceeds to the address stage "10". The branch condition "000" is invalidated in the data region. If a split is generated in the data region, then the CDR counter 40 maintains the current count value, generates the signal. CDRINT and selects the next address stage, thereby proceeding to the address stage "20" in the microprogram of FIG. 9. The CDR counter 40 counts and compares a number of data bytes with the CDR value, and if the both are same, then it generates the CDRINT. The address generator 38 stores the current stage value upon generation of the CDRINT and generates the next stage address "N_ADD". Here, the CDR counter 40 keeps the current value during the processing of the CDRINT, and after processing the CDRINT it starts to again count the number of data, thereby processing a total of 512 bytes of data before proceeding to the next stage. Describing further the CDR procedure in Read Mode, the CDR interrupt is generated to store the current WCS_ADD and count value, and then the control jumps to an address stage "19" of FIG. 9, namely, to VECT1. Accordingly, the control returns to the main routine and the current WCS_ADD and count value are again stored.

Next, in step 246 corresponding to the address stage "10", 12 bytes of ECC data of FIG. 4 are read out of the disk. In step 248 corresponding to the address stage "11", if the ECC data read our from the disk is different from the internally generated ECC data, then it stop the operation of sequencer to perform the error correction operation. However, if there is no error, then it advances to the next address stage "12".

In the meanwhile, in step 250 corresponding to the address stage "12", the comparison with the current DSTC value is made, in which if the result of comparison is "0", then it means completion of the read operation for intended sectors, and therefore, the sequencer controls to stop generation of addresses in the address generator 38 and ends the execution. However, if the DSTC value is not "0", then the sector updating circuit 54 performs the TSNO increase as well as the DSTC decrease and it proceeds to the address stage "00" in order to process another sector. Further, in steps 252 to 254 corresponding to the address stage "19", the timer 46 is enabled and the current status is kept till detection of the EOS. Here, if the EOS is detected, then it proceeds to a next address "1A", while if it is timeout, then the operation ends by an automatic stopping. In step 256 corresponding to the address stage "1A", 7 bytes of the value "00" of the VFO field are read from the disk. In steps 258 to 260 corresponding to the address stage "1B", the sync counter of the timer 46 is enabled and it is awaited till reading of the sync pattern. At this moment, if the timeout occurs, then the operation is stopped, and if the sync pattern is detected, then the control proceeds to the address stage "0F" that is the original position that the CDRINT was generated in the address generator 38 by the CDRRTN having a priority than the branch condition. Therefore, it will be appreciated that the disk read operation from the disk is carried out as aforementioned.

The stack 52 store the information HCYLH, CYLL, TSNO and FCDRH by the signal PUSHEN in case that the most significant bit of the data selection field is "1", namely, in the address stages "03", "05" and "06".

Write Mode

Referring again to FIG. 9, there is shown a microprogram diagram for a Read/Write Mode of the programmable control sequencer according to the sequencer map allocation of FIG. 5, wherein in the diagram a column "ADDRESS" indicates the RAM address for RAM 36, "BRANCH" the branch field of FIG. 5, "N_ADD/CNT" the next address/count field, "OT" the output field, "GATE" the gate field, "FIELD" the field region, and "D_SEL" the data selection field.

Figure 11A:
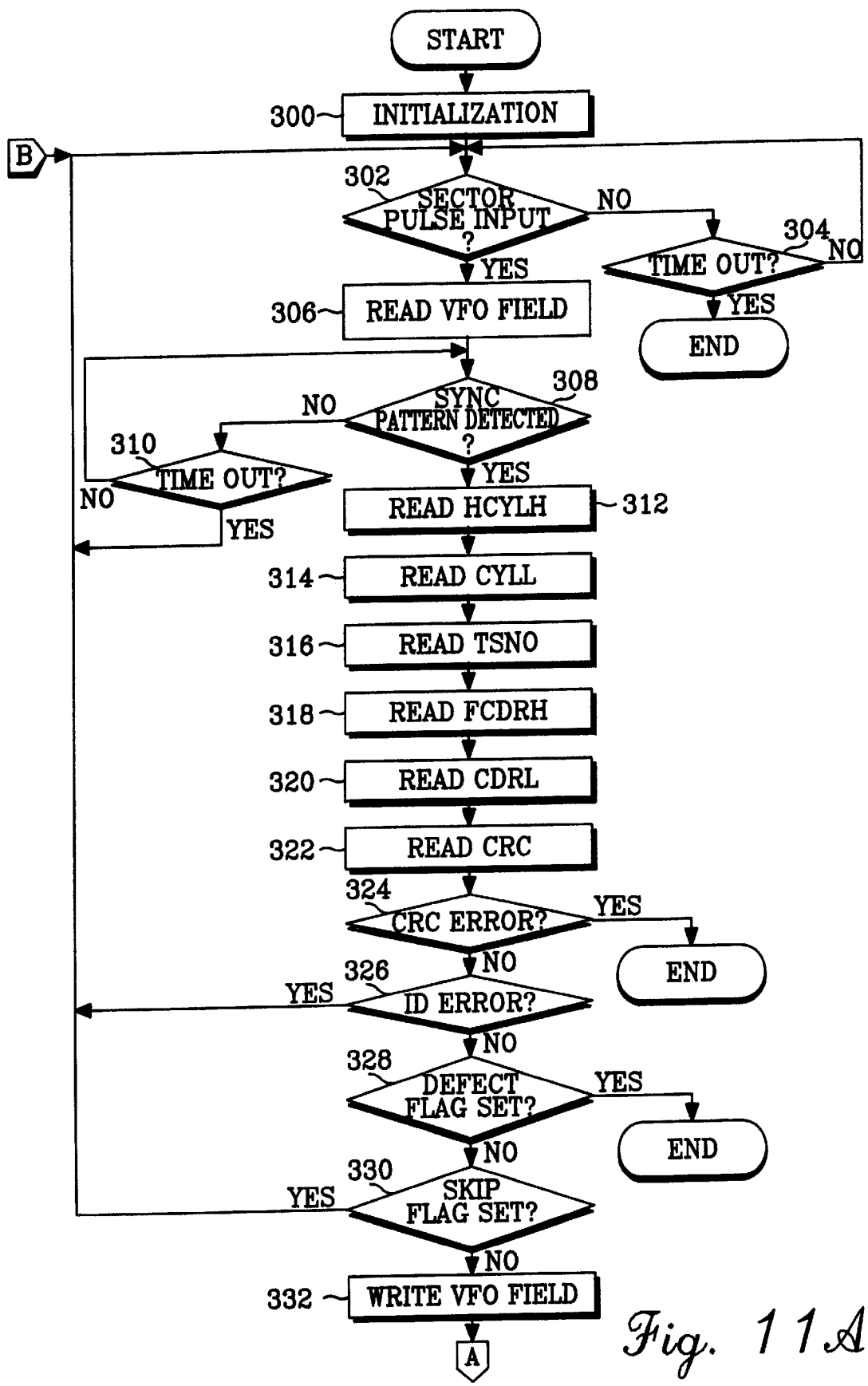
FIGS. 11A and 11B are flow charts illustrating the control steps for the programmable control sequencer in the WRITE mode of FIG. 9.
Figure 11B:
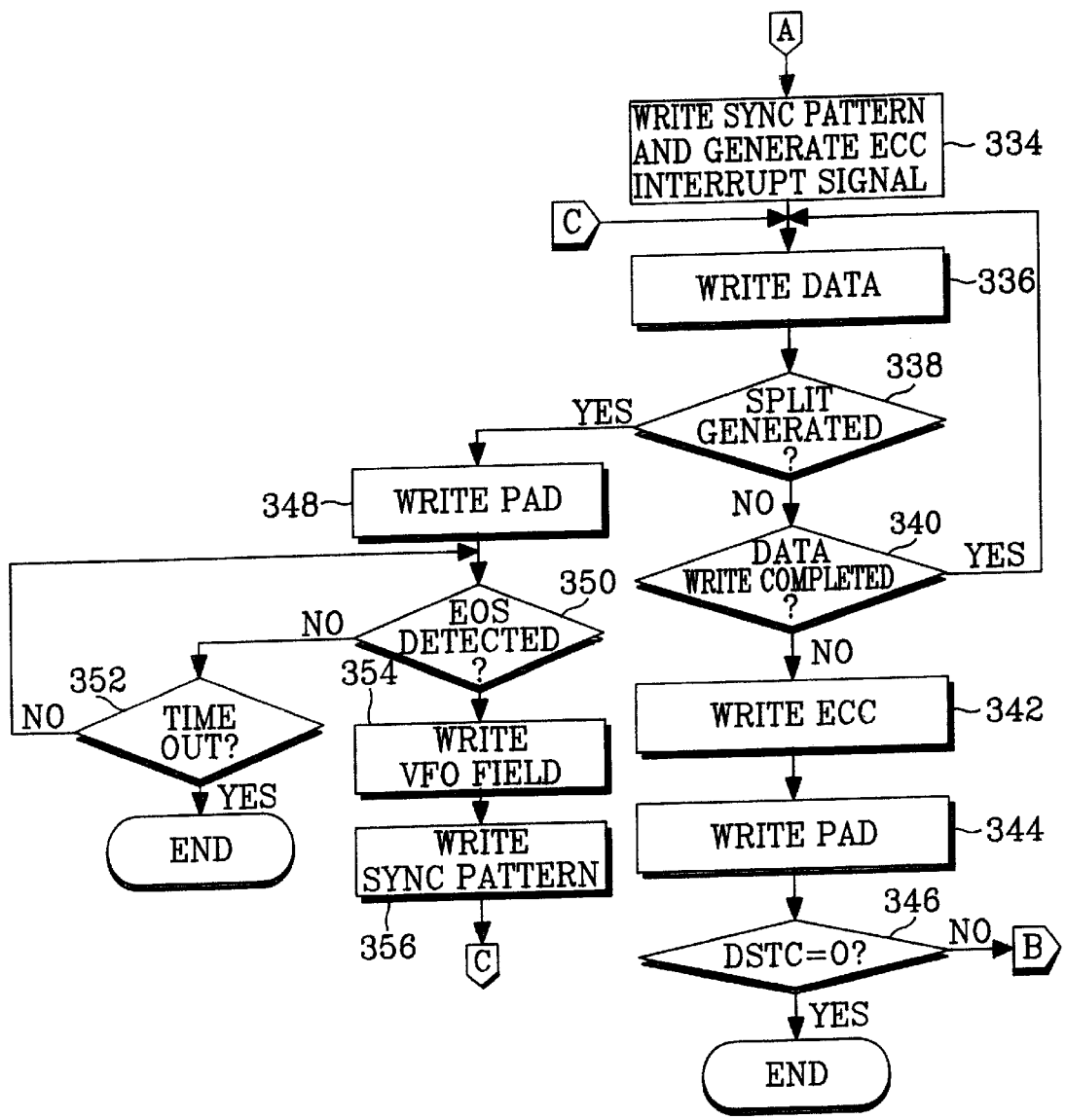

Referring now to FIGS. 11A and 11B taken together, there is shown the flow chart defining the control steps for the programmable control sequencer in the Write mode of FIG. 9. Also, the execution of the flow chart is controlled by the sequencer shown in FIG. 6.

First of all, the initialization procedure in step 300 and the operations in the successive steps from step 302 to step 330 corresponding to the address stages "00" to "0B" in sequence are substantially identical or similar to those in the aforementioned steps 200 to 230 described heretofore during the Read Mode, which description is refrained from putting hereinafter again for convenience' sake.

Therefore, the address stage "0C" advances to the address stage "13", in which in step 332 corresponding to this address stage, the timer enable signal TIMEREN is delivered from the branch decoder 44 to the timer 46. Here, a counter in the timer 46 continues to read the value "00" tin it reaches the next address/count field value. Thus, after writing 12 bytes of the value "00" into the VFO field of the ID field of FIG. 3 it proceeds to the address stage "14" by the INC. Then, in step 334 corresponding to the address stage "14", the sync pattern is written on the disk. Further, the signal ECCINI is generated to assign an area for ECC checking of the data section and then, the CDR counter 40 generates the signal DATAEN indicating that the data region begins at the next stage.

Next, in steps 336 to 340 corresponding to the address stage "15", if the split should not occur in the data region, then the data as shown in FIG. 4 is written into the disk until the count value of the CDR counter 40 reaches a number 512 and thereafter, it proceeds to the address stage "16". The branch condition "000" is invalidated in the data region. If a split occurs in the data region, then the CDR counter 40 maintains the current count value, generates the signal CDRINT and selects the next address stage, thereby proceeding to the art address stage "1C" in the microprogram of FIG. 9. The CDR counter 40 counts and compares a number of data bytes with the CDR value, by which if the both are same, then it generates the CDRINT. The address generator 38 stores the current stage value upon generation of the CDRINT and generates the next stage address "N_ADD". Thus, the CDR counter 40 keeps the current value during the processing of the CDRINT, and after processing the CDRINT it starts to again count the number of data, thereby processing a total of 512 bytes of data before proceeding to the next stage. Referring further to the CDR procedure during the Write Mode, the CDR interrupt is generated to store the current WCS_ADD and count value, and then the control jumps to the address stage "1C" of FIG. 9, namely, to VECT2. Accordingly, the control returns to the main routine and the current WCS_ADD and count value are again stored.

In the following step 342 corresponding to the address stage "16", 12 bytes of ECC data as shown in FIG. 4 are created to be written into the disk. In step 344 corresponding to the address stage "17", 2 bytes of value "00" are written as the PAD into the disk. In the meanwhile, in step 346 corresponding to the address stage "18", the comparison with the current DSTC value is made, in which if the result of comparison is "0", then it means completion of the write operation for intended sectors, and therefore, the sequencer controls to stop generation of addresses in the address generator 38 and ends the execution. However, if the DSTC value is not "0", then the sector updating circuit 54 performs the TSNO increase as well as the DSTC decrease and it proceeds to the first address stage "00" in order to process another sector.

Further, in step 348 corresponding to the address stage "1C", 2 bytes of value "00" are written as the PAD into the disk. In steps 350 to 352 corresponding to the address stage "1D", the timer 46 is enabled and the current status is kept till detection of the EOS. Here, if the EOS is detected, then it proceeds to the address "1A", while if it is timeout, then the operation ends by an automatic stopping. In step 354 corresponding to the address stage "1E", 12 bytes of the value "00" of the VFO field are written into the disk. In step 356 corresponding to the address stage "1F", the sync pattern is written into the disk and then, the control proceeds to the address stage "0F" that is the original position that the CDRINT was generated in the address generator 38 by the CDRRTN having a priority than the branch condition. Therefore, it will be appreciated that the disk write operation onto the disk is carried out as aforementioned.

As a result, the stack 52 stores the information HCYLH, CYLL, TSNO and FCDRH by the signal PUSHEN in case that the most significant bit of the data selection field is "1", namely, in the address stages "03", "05" and "06".

Accordingly, as apparent from the foregoing, notwithstanding using of the program RAM of 32×2 byte size for the programmable control sequencer according to the sequencer map allocation as set forth in the present invention, an effective Format/Read/Write operation could be completed. As a result of this down sizing of RAM capacity by at least about 50% as compared to the prior ones, it will be appreciated that the hardware construction of a programmable control sequencer could be more effectively simplified. Moreover, as a shorter time is required for a microcontroller to down load the program (for example, 32×2×3T=192T in the above embodiment), the overhead of a microcontroller decreases by about 48.8% as compared to the aforesaid known microcontroller (for example, CL-SH5600 Model), which will lead to less loading to a programmable control sequencer of a disk controller for the magnetic disk drive recording apparatus.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A programmable control sequencer of a disk controller for use in a magnetic disk drive storage system, comprising:

a program random access memory (RAM) having a given number of byte size of storage area, provided with a sequencer map allocation comprising a branch field, a next address/count field, an output field, a gate field, a field region and a dedicated data selection field, the next address/count field being selectively used as one of a next address field and a count field according to the content of the branch field;

an address generator for generating an address for accessing said program random access memory in accordance with information of said branch field and said next address/count field to thereby provide said address to said program random access memory;

a branch decoder for decoding said branch field information to provide decoded information to said address generator;

a field decoder for decoding field area information to provide the decoded field area information to said address generator;

a Constant-Density Recording (CDR) counter for counting a value for Constant-Density Recording (CDR) split by means of said field decoder to thereby control said address generator;

a timer for starting an operation according to a branch condition of said branch field and limiting the maximum operating time for said branch decoder;

a data selection circuit for selecting data read out from a data disk and a value of a data register in accordance with the information of said dedicated data selection field to thereby compare said data read out from the data disk with said value of the data register and for pushing compared data into a stack;

a gating circuit for generating a Read/Write control signal to control operation of said data disk and a signal to update a sector in accordance with information of said gate field; and a sector updating circuit for executing sector updating responsive to an output of said gating circuit.

2. The programmable control sequencer as set forth in claim 1, wherein said program random access memory comprises a 32×2 byte size of data storage area.

3. A map allocation method for a programmable control sequencer in a disk controller for use in a magnetic disk drive storage system, comprising the steps of:

providing a program random access memory having a 32×2 byte size of data storage area for the disk controller;

providing said program random access memory with a sequencer map allocation comprising a branch field, a next address/count field, an output field, a gate field, a field region and a dedicated data selection field, wherein:

said branch field selectively has one of branch condition and count field enable information;

said next address/count field selectively having one of a next address and a count value according to said branch condition;

said output field for testing synchronization outside said programmable control sequencer;

said gate field for performing a Read/Write gate control and making an increase of a target sector number and a decrease of a disk sector transmit count;

said field region representing an Error Detection Code (ECC)/Cyclic Redundancy Code (CRC) block and a Constant-Density Recording (CDR return; and said dedication data selection field for comparing data selected from a given data register with data read out of a disk to thereby process the data read out of the disk according to the result of comparing the data selected from the given data register with the data read out of the disk.

4. The map allocation method as set forth in claim 3, wherein said branch field represents in accordance with a 3-bit code combination thereof one of one condition of a count field enable, branching all the time, waiting index pulse/sector pulse/servo end signal, waiting synchronization detection, branching on Identification (ID)/buffer error, branching on Cyclic Redundancy Code (CRC)/Error Detection Code (ECC) error, branching on disk defect, and branching on End Of Track (EOT).

5. The map allocation method as set forth in claim 3, wherein said next address/count field has a 5-bit value usable as one of the next address and the count value according to a code of said branch field.

6. The map allocation method as set forth in claim 4, wherein in data Read and Write cycles the count field enable is disabled and a next address/count field is used as a next address field.

7. The map allocation method as set forth in claim 4, wherein said output field has an 1 bit code value.

8. The map allocation method as set forth in claim 7, wherein said gate field is usable for data Read/Write controls in the disk and a sector updating operation independently of a microcontroller of said disk controller.

9. The map allocation method as set forth in claim 8, wherein said gate field represents according to a 2-bit code combination one of a non-operation, a Read gate set, a Write gate set, an increase of target sector number and a decrease of disk sector transmit count.

10. The map allocation method as set forth in claim 9, wherein said field region is for use in Error Detection Code (ECC)/Cyclic Redundancy Code (CRC) block initialization and to indicate a return point in a Costant-Density Recording (CDR) subroutine according to a 2-bit code combination thereof.

11. The map allocation method as set forth in claim 10, wherein said field region represents one of the non-operation, data for Error Detection Code (ECC) block initialization, an Identification (ID) for Cyclic Redundancy Code (CRC) block initialization, and a return from the Constant-Density Recording (CDR) subroutine.

12. The map allocation method as set forth in claim 11, wherein said dedicated data selection field is for comparing with data read out of the disk and selection of data to write onto the disk during a disk operation according to a corresponding code combination.

13. The map allocation method as set forth in claim 12, wherein said dedicated data selection field represents according to a 3-bit code combination thereof one of one condition of Variable Frequency Oscillator (VFO)/ Postamble (PAD)/Splice/Non-operation, synchronization pattern, Data Sector Information/Split Information Low (CDRL), Cyclic Redundancy Code (CRC)/Error Detection Code (ECC) value, Head Number (HCYLH), Cylinder Number (CYLL), a target sector number, and Additional Data Sector Information/Split Information Upper (FCDRH).

14. The map allocation method as set forth in claim 3, wherein an address "1F" in hexadecimal of said program random access memory is usable for one of a Constant-Density Recording (CDR) subroutine in a control program stored in said program random access memory and for an ending condition of said control program.

* * * * *